United States Patent [19]

Boyer

[11] 4,053,893
[45] Oct. 11, 1977

[54] METHOD OF AND APPARATUS FOR INDICATING THE GEOGRAPHICAL POSITION OF A PILOT VEHICLE

[75] Inventor: Francis Boyer, Elancourt, France

[73] Assignee: Societe Francaise d'Equipements pour la Navigation Aerienne S.F.E.N.A., Velizy-Villacoublay, France

[21] Appl. No.: 632,971

[22] Filed: Nov. 18, 1975

[30] Foreign Application Priority Data

Nov. 18, 1974 France .................. 74.37993

[51] Int. Cl.² .............................................. G01S 3/02
[52] U.S. Cl. ................................ 343/112 PT; 340/24
[58] Field of Search ...................... 343/112 C, 112 PT; 340/24

[56] References Cited

U.S. PATENT DOCUMENTS

| 3,114,912 | 12/1963 | Tooley | 343/112 PT |
| 3,249,942 | 5/1966 | Fernandez | 343/112 PT |

*Primary Examiner*—T.H. Tubbesing
*Assistant Examiner*—T. M. Blum
*Attorney, Agent, or Firm*—Karl W. Flocks

[57] ABSTRACT

The present invention relates to a method of and apparatus for indicating the geographical position of a piloted vehicle equipped with a computer, the method comprising the steps of using a geographical map or a portion of map, approximately orientated, without regard to its method of folding and its dimensions; identifying and transmitting to the computer at any desired moment, basic information such as reference of alignment on a meridian of the map-references of magnetic declination and scale of said map, co-ordinates of at least one radio-navigation transmitter chosen on the map, co-ordinates of at least one objective to be reached on the map, co-ordinates of at least one possible intermediate point on the route; indicating on said map at any instant under the control of the computer which also receives the variable radio-navigation information from the transmitter selected, the geographical position of the vehicle, the above identification and indication steps being effected by the use of a single organization of means.

The apparatus includes a slot having access to three sides for receiving the map which is immobilized, folded and roughly orientated, behind a double-glazed window, the means for alignment with a meridian of the map being constituted by pointers brought into coincidence with the meridian and means for supplying the computer with information of the angular position of said map with respect to the indicator.

The vehicle is especially but not exclusively a flying vehicle.

4 Claims, 3 Drawing Figures

METHOD OF AND APPARATUS FOR INDICATING THE GEOGRAPHICAL POSITION OF A PILOT VEHICLE

The present invention is concerned with a method and an apparatus for indicating in a continuous manner to the pilot of a vehicle (especially but not exclusively a flying vehicle) his geographical position shown on a map.

Numerous devices of this kind already exist in service or in development, which utilize three main techniques, separately or in combination:
  Map systems unrolled by electro-mechanical means;
  map systems projected by optical means (films);
  synthetic map systems generated electronically.

These systems have certain disadvantages which restrict their general use: they are bulky, heavy, expensive and for those which give indications on the ground infrastructure and the routes to be followed, the time required for bringing the maps up-to-date is relatively long. Furthermore, in respect of the last category, the risks of error in the charging of the memories are also high.

These equipments are essentially employed on combat vehicles and on few air-line machines.

The present invention enables inter alia these disadvantages to be reduced due to the fact that it does not put into memory a specific map system, but on the contrary is organized so as to utilize suitable maps extracted from the documentation proper to the crew, published and brought up to date much more frequently, and in any case they do not increase the risk of error in the infrastructure information utilized by the crew.

The invention relates to a method which is characterized in that it makes use of a geographical map or a portion of map, approximately orientated, irrespective of its folding system and its size, and in that it consists, by means of a single organization of means, on the one hand of identifying and transmitting to a computer, at any selective moment, basic information, and on the other hand of indicating at any instant on the map, under the control of the said computer which also receives variable radio-navigation information, the geographical position of the vehicle.

The method consists also of concentrating the function of identification of basic coordinates and the function of indication of geographical position on a single figurative point capable of being displaced above the map, on the one hand by the user himself and on the other hand automatically under the control of the computer.

The invention is also directed to an apparatus which is compact, simple to handle and reliable in operation, which carries the said method into effect.

Other characteristic features and advantages of the present invention will be brought out in the description which follows below, reference being made to the accompanying drawings, in which.

Figure 1:
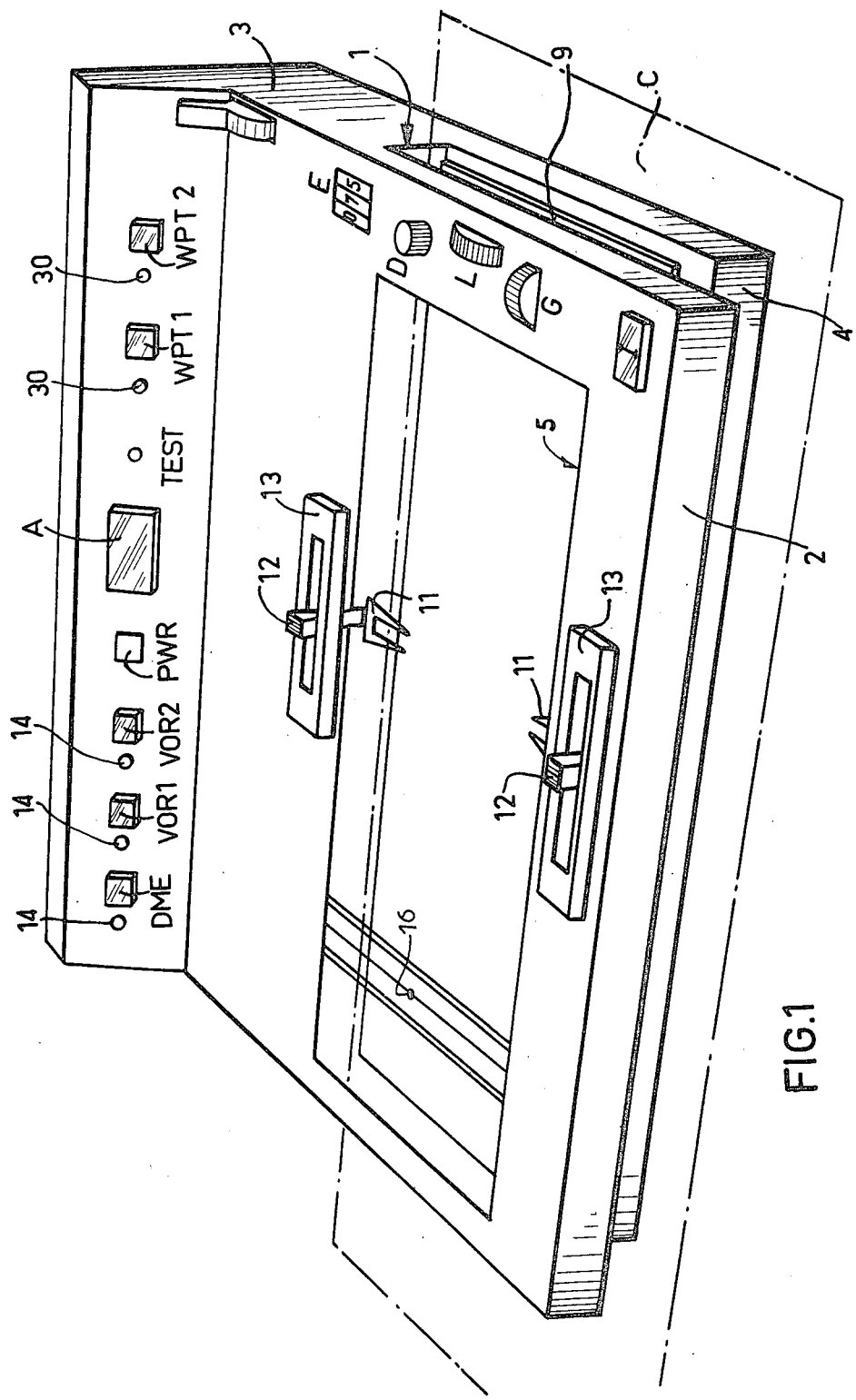
FIG. 1 shows in perspective an indicator device in accordance with the invention.

The indicator apparatus according to the invention shows a slot 1 having access from three sides, delimited by an upper portion 2 a side portion 3 and a lower portion 4.

In the upper portion is formed a window 5 through which is observed the reference map C which has been inserted in the slot 1 of the apparatus.

In the side portion is housed the essential mechanisms of the apparatus.

In the lower portion is located a pressing device which will be described later.

The indicator may be installed on the dashboard or fixed on the user's thigh by means of a support and a strap.

In this latter case, the orders and information generated from the indicator, the controls delivered by a computer O to the indicator and the supply voltages necessary for its operation are transmitted by a flexible lead, fixed to the indicator, and which is plugged into a socket fixed on the dashboard.

Electrical activation of the unit is effected by an "On-Off" switch of an individual type mounted on the dashboard.

As soon as the apparatus has electrical power on, a red flag PWR (FIG. 1) disappears by the action of an electro-magnet.

Various push-buttons DME (distance $\rho$) - VOR1 (angle $\theta$) VOR2 (FIG. 1) are placed in the "rest" position (Out) at the beginning of the utilization procedure.

Figure 2:
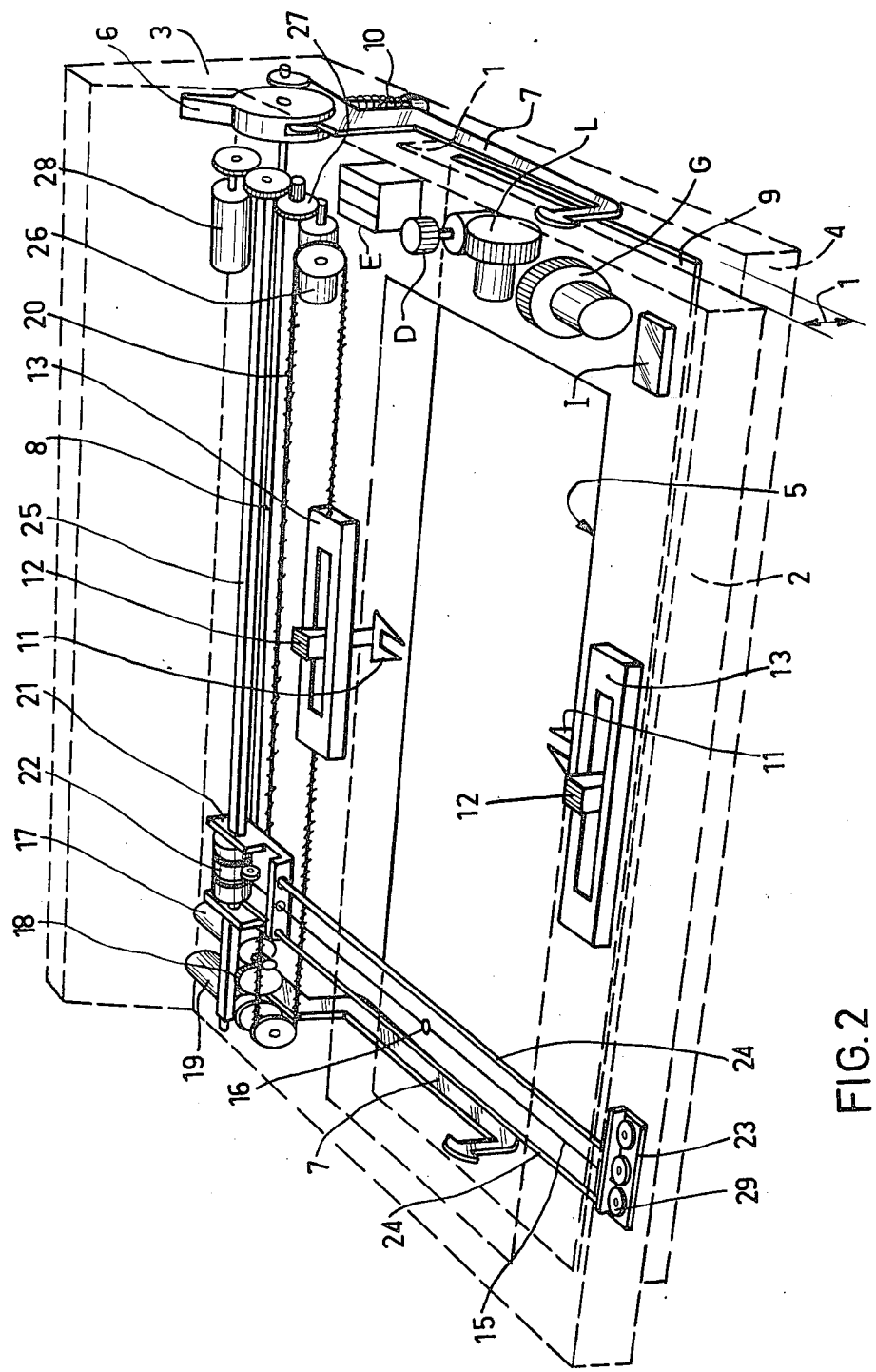
FIG. 2 is a similar view showing in addition the internal mechanisms.

A control level 6 (FIG. 2) actuates a system of two arms 7 fixed to each other by a transverse shaft 8. On the two arms rests a plate 9 intended to force the map against the internal face of the window 5. A spring 10 compressed by one of the arms facilitates locking in the top position and prevents accidental release. In the position "unlocking", the level 6 transmits by means of a micro-contact (not shown) continuous information for the resetting to zero of the memories of the computer.

The map folded in such manner as to show the useful zone in the perimeter of the window is inserted between the pressure plate and the internal face of the window, in a position such that the meridional lines are approximately vertical, the North of the map being at the top of the window. Operation of the locking lever 6 results in the immobilization of the map by forcing it against the internal face of the window.

In the case where the appropriate map has remained in the apparatus from the previous flight with the pressure system locked, it is not necessary to remove it.

When the system is under voltage with the map inserted and locked, the computer lights up a signal "Alarm A" (FIG. 1) indicating to the user that he must carry out the sequence giving the basic indications necessary for the calculation.

Two fork-shaped independent pointers 11 are located between the glasses of the window, which is double-glazed or transparent plate and these pointers are controlled from the exterior by knobs 12 placed on the edge of the window, at the top and at the bottom of this latter and are brought by the user into coincidence with the same meridional line shown on the map. The fork-shape permits the pointers to be placed to the best advantage, irrespective of the conditions of flight, the fork of each pointer being placed astride the line.

Two associated potentiometers 13 then supply the computer with the angular position information of the map with respect to the indicator, this information being a function of the respective positions of the pointers.

The computer treats this information in such manner as to deduce a continuous correction term which is put into the memory. This placing in the memory is validated by an action of the user on the push-botton I. This has the effect of extinguishing the indicator A for one second, showing that the indication has been taken into account and that this phase has been completed normally.

The indicator A being again lighted, the user registers the magnetic declination indicated on the map by means of a knob D moving a pointer in front of a graduated scale.

A coding device associated with the knob transmits the declination information to a memory. This latter is validated as previously.

In the same manner and for the same reasons, the indicator A goes out for one second. When the indicator is again lighted, the user registers numerically the scale of the map in the event of this differing from that of the map utilized for the previous flight, by acting on three pancake rollers E (FIG. 1), numbered from 0 to 9, the extreme right-hand roller indicating the tenths of nautical/inch. A coding system associated with the rollers transmits the scale value adopted which is memorized by pressing the push-button I. The indicator A is extinguished and only re-lights in the case of a fault or a test in course of operation. On the left-hand side of the front face (FIG. 1) are provided three push-buttons with mechanical locking (DME, VOR1-VOR2) on which it has been seen above that they must be in the "Out" position at the beginning of the utilization procedure. Each of them is accompanied by a small indicator 14.

These push-bottons permit the selection of the type of radio-navigation reference as a function of the beacons utilized during the course of the flight considered.

If the case is examined in which there is available in the area of the window co-installed transmitters VOR, DME.:

The user proceeds first of all to the selection of the frequency on the receivers. Then he depresses the push-button DME. The corresponding indicator lights-up, showing him that the servocontrols which actuate the displacement of a wire 15 (FIG. 2) carrying a figurative point 16 are at his disposal. The user then acts on a knurled knob G (longitude) in such manner as to cause the wire to pass through the point on the map representing the beacon DME. The knurled knob provided with a return to zero and associated with a potentiometer, acts through the intermediary of the output stage of the computer on a motor 17.

Through the intermediary of gearing 18, the motor transmits its movement to a multi-wound potentiometer 19 and to a small driving chain 20 coupled to a trolley 21.

The mobile assembly formed by the trolley, a drum 22, a pulley support 23, carried by tubes 24, actuated by the small chain, moves laterally, carrying with it the wire 15. The guiding is effected by a fluted shaft 25.

When the wire has been placed in the desired position, the user acts on a knurled knob L (latitude) in such manner as to place the figurative point on the point of the map which represents the beacon.

The knurled knob L, arranged like the knurled knob G, acts through the intermediary of the output stage of the computor on a motor 26.

This motor transmits its movement through a gearing system 27 to a wound potentiometer 28 and to the splined shaft 25. The drum 22 is fast for rotation with the splined shaft. The wire carrying the figurative point is wound with several turns round the drum. The return of the wire is effected through the intermediary of tension pulleys 29 in the interior of one of the tubes 24.

The figurative point being then in correspondence with the point of the map which represents the beacon, the user memorizes the position information by means of the push-button I. This information is given to the computer by the wound potentiometers. The taking into account of the information by the memory has the effect of extinguishing the indicator associated with the push-button DME. The knurled knobs are inoperative and the computer holds the mechanism stopped, waiting for a second reference.

As soon as the indicator is extinguished, the user can select the second means: by depressing the push-button VOR1, the corresponding indicator lights-up with the same significance as in the case of the DME.

In the present case, as the beacons are co-installed, the figurative point of the VOR is immediately obtained and the action on I will memorize this, extinguishing the associated indicator.

In the choice of the means VOR1 and VOR2, it would be necessary to proceed to two separate designations, as has been described with reference to the means DME.

After memorization of the second means, the computer adapts the information of bearing and distance which it receives from the receivers R (VOR and DME).

Figure 3:
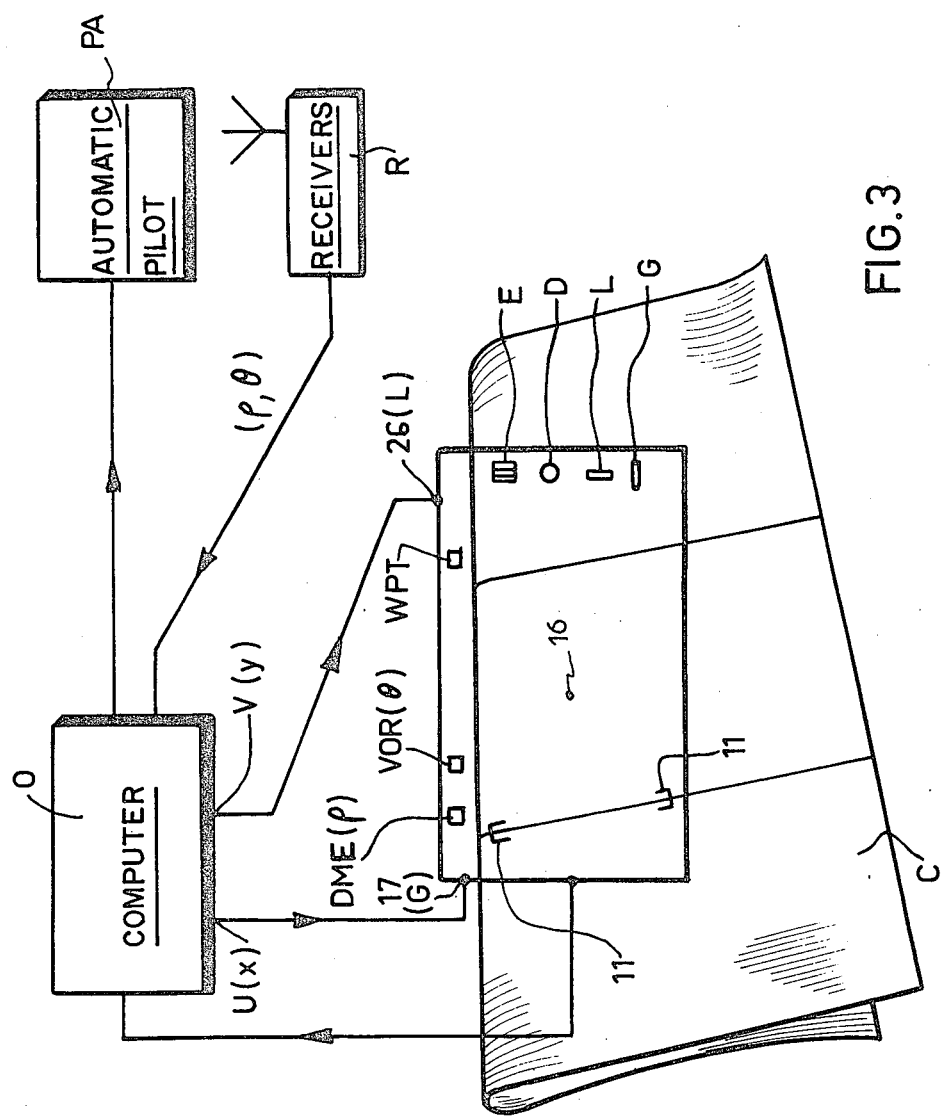
FIG. 3 is an explanatory diagram showing the indicator apparatus and its associated devices.

This information is treated as shown diagrammatically in FIG. 3 while taking account of the corrector terms put into memory of computer O in such manner as to generate two signals $U(x)$ and $V(y)$ from computer O controlling respectively the motors 17 and 26. The point 16 representing the moving body takes up a position at a point which indicates the actual position of the aircraft with respect to the map C. During the course of the flight, the computer constantly treats the information from the receivers R of VOR and DME signals, and the point 16 describes on the map the continuous trajectory of the aircraft, instantaneously informing the user of its position and thereby reducing the differences and corrections.

A commercial computer to which the devices can be connected is for example computer model UMP 6800 made by SFENA. This computer as well as other known universal computers provided with interface cards is able to perform the functions associated with the geographical position indicating apparatus of the present invention. Also the VOR and DME receivers which may be used are for example a VOR receiver by Bendix, Model RVA 33A and a DME receiver by King, Model KDM 7000.

If, during the course of flight, the user decides to take as a reference a beacon having a more favorable position, he acts on the push-button of the means considered i.e. DME or VOR, causing it to pass to rest. After having fixed the corresponding receiver R on the new frequency, he again acts on the push-button and the indicator which is associated therewith lights-up.

The user acts on the knurled knobs G and L, as previously described for the choice of the means DME, in such manner as to indicate the position of the new beacon utilizing knobs L and G. After memorizing this information by acting on the push-button I, the indicator associated with the push-button considered is extinguished and the point representing the moving body comes to indicate the actual position of the aircraft, the indicator reassuming its function. Action on the knurled wheels G and L is then without effect. This procedure is applicable to all cases, either of changing position while retaining the same type of reference, or of changing the type of reference (VOR-VOR instead of VOR - DME for example).

Two additional push-buttons WPT1, WPT2 (points on the route) each provided with an indicator 30, are mounted on the right-hand side of the indicator A.

These push-buttons make it possible to indicate to the computer, by a process of selection and indication identically the same as that of the references, an objective or two successive objectives or intermediate points on the route. The computer having memorized the position of the objective or objectives supplies the automatic pilot PA with information permitting this latter to guide the aircraft on the first objective chosen and then, if so desired, on the second objective.

Finally, the user can draw on the glass constituting the front face of the window, by means of a suitable pencil, more or less complicated trajectories which permit him to effect the reliable and easy execution of the flight following these trajectories with manual or simple automatic piloting.

It will of course be understood that the present invention has been described and shown only by way of a preferred example, and that equivalents may be brought into its constituent parts without thereby departing from the scope of the said invention, as defined in the appended claims.

I claim:

1. An apparatus for use in indicating the geographic position of a craft in accordance bearing and distance information from beacon transmitters, said indicating apparatus comprising
   a casing;
   a figurative point movable according to two orthogonal displacements;
   an access slot gaping on three sides of said casing so as to receive a geographical map or portion of a map even when approximately oriented and folded for reception in said gap;
   a window placed above said map receiving slot, said figurative point being displaceable in the area of said window in order to occupy any position in the window;
   means for alignment with the meridian of said map, constituted by pointers which are brought into coincidence with said meridian;
   two associated transducers for supplying signals representing angular position information of said map with respect to said indicating apparatus, this information being a function of the respective positions of said pointers;
   means for setting values for basic reference information signals including information on magnetic declination, and scale of said map;
   a device for locking said map in position at the back of said window holding it firmly and accepting the folding of said map in several thicknesses, the operation of indicating apparatus being subordinated to the locking of said maps through said locking device.

2. An apparatus as claimed in claim 1 and further comprising:
   a glass constituting the rear face of said window which is double-glazed;
   a glass constituting the front face of said window;
   a pressure-plate forming part of said locking device and immobilizing said map against said rear-face glass;
   said figurative point being displaced between the two said glasses and the front face glass being adapted to receive from the user any temporary indication.

3. An apparatus as claimed in claim 1 and further comprising
   a wire carrying said movable figurative point, said wire being adapted to be translated by displacement in abscissae in order to obtain a longitude and to be wound and unwound by displacement in ordinates in order to obtain a latitude;
   a first chain of components including a first motor, a first wound potentiometer and a translation trolley, and a second chain of components including a second motor, a second wound potentiometer, and a winding and unwinding drum mounted on said trolley, permitting the two displacements of said figurative point,
   whereby said two displacements of said figurative point serve, when controlled by the user, for determining either
      the position on said map of selected beacon transmitters;
      the position on said map of objectives and points on the route;
      and said two displacements of said figurative point serve, for determining, at every moment, thé exact position on the map of said craft.

4. An apparatus as claimed in claim 1 and further comprising:
   a single knob for fixing the value of basic reference information relating to declination;
   two simple knurled knobs for the control by the user of said two displacements of said figurative point;
   three knurled knobs for fixing the value of basic reference information relating to scale;
   push-buttons accompanied by indicators especially for the selection of radio navigation references, including beacon transmitters, objectives and points on the route.

* * * * *